(12) United States Patent
Stanford et al.

(10) Patent No.: US 10,906,581 B2
(45) Date of Patent: Feb. 2, 2021

(54) RACK-LIMITING CONDITION DETECTION AND THE CORRESPONDING STEERING WHEEL TORQUE FEEDBACK FOR STEER BY WIRE STEERING SYSTEMS

(71) Applicant: STEERING SOLUTIONS IP HOLDING CORPORATION, Saginaw, MI (US)

(72) Inventors: Scott T. Stanford, Swartz Creek, MI (US); Kai Zheng, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 66 days.

(21) Appl. No.: 16/206,086

(22) Filed: Nov. 30, 2018

(65) Prior Publication Data

US 2019/0176883 A1 Jun. 13, 2019

Related U.S. Application Data

(60) Provisional application No. 62/595,756, filed on Dec. 7, 2017.

(51) Int. Cl.
*B62D 6/00* (2006.01)
*B62D 5/04* (2006.01)
*B60T 7/12* (2006.01)
*G06F 19/00* (2018.01)
*B60T 15/02* (2006.01)
*B60T 8/52* (2006.01)
(Continued)

(52) U.S. Cl.
CPC .............. *B62D 6/008* (2013.01); *B62D 5/001* (2013.01); *B62D 5/0469* (2013.01); *G05D 1/021* (2013.01); *G05D 2201/0213* (2013.01)

(58) Field of Classification Search
CPC .. B62D 6/00; B62D 5/04; B62D 15/02; G06F 19/00; B62T 7/12; B60T 8/52
See application file for complete search history.

(56) References Cited

U.S. PATENT DOCUMENTS

| 5,198,981 A | 3/1993 | Collier-Hallman et al. |
| 5,704,446 A | 1/1998 | Chandy et al. |

(Continued)

OTHER PUBLICATIONS

Chinese Office Action for related CN Application No. 201710276742.0, dated Aug. 24, 2018; 12 pages.

(Continued)

*Primary Examiner* — Yuri Kan
(74) *Attorney, Agent, or Firm* — Dickinson Wright PLLC (57) ABSTRACT

Technical solutions are described herein for steer-by-wire (SBW) steering systems to detect a rack-limiting condition and generate feedback signal that can provide responsive handwheel torque for a driver. According to one or more embodiments the steer-by-wire steering system includes a processor that receives input signals comprising a handwheel velocity signal and a vehicle speed signal. The processor determines a simulated left end stop position of a rack based on the input signals, and a simulated right end stop position of a rack based on the input signals. The processor compares a rack position with the simulated left end stop position and the simulated right end stop position. The processor generates a feedback signal based on a determination that the rack position is not within a range bound by the left end stop position and the right end stop position.

20 Claims, 7 Drawing Sheets

(51) Int. Cl.
B62D 5/00 (2006.01)
G05D 1/02 (2020.01)

(56) References Cited

U.S. PATENT DOCUMENTS

| | | | |
|---|---|---|---|
| 5,754,967 A * | 5/1998 | Inoue | B60T 8/172 |
| | | | 701/54 |
| 6,370,460 B1 | 4/2002 | Kaufmann et al. | |
| 6,625,530 B1 | 9/2003 | Bolourchi | |
| 7,512,468 B2 | 3/2009 | Tamaizumi et al. | |
| 2003/0060955 A1 | 3/2003 | Suissa | |
| 2005/0256620 A1 | 11/2005 | Kato et al. | |
| 2007/0213913 A1 * | 9/2007 | Ushiroda | B60T 8/1755 |
| | | | 701/82 |
| 2008/0154464 A1 * | 6/2008 | Sasajima | B62D 15/0285 |
| | | | 701/42 |
| 2008/0177442 A1 * | 7/2008 | Tsukasaki | B62D 7/09 |
| | | | 701/38 |
| 2014/0257641 A1 | 9/2014 | Champagne et al. | |
| 2015/0367884 A1 | 12/2015 | George et al. | |
| 2016/0159394 A1 * | 6/2016 | Ryu | B60W 30/12 |
| | | | 701/41 |
| 2016/0264172 A1 | 9/2016 | Oiki et al. | |
| 2016/0272197 A1 | 9/2016 | Hulten et al. | |
| 2016/0280251 A1 | 9/2016 | George et al. | |
| 2017/0096161 A1 * | 4/2017 | Ko | B62D 5/046 |
| 2017/0203785 A1 | 7/2017 | Naik et al. | |
| 2017/0232998 A1 | 8/2017 | Ramanujam et al. | |
| 2019/0210643 A1 * | 7/2019 | Matsumoto | G08G 1/16 |

OTHER PUBLICATIONS

Varunjikar, Tejas, "Design of Horizontal Curves with Downgrades Using Low-Order Vehicle Dynamics Models," A Thesis in Mechanical Engineering, The Pennsylvania State University, The Graduate School Department of Mechanical Engineering, May 2011, pp. 1-141, University Park, Pennsylvania.

* cited by examiner

RACK-LIMITING CONDITION DETECTION AND THE CORRESPONDING STEERING WHEEL TORQUE FEEDBACK FOR STEER BY WIRE STEERING SYSTEMS

CROSS-REFERENCES TO RELATED APPLICATIONS

This patent application claims priority to U.S. Provisional Patent Application Ser. No. 62/595,756, filed Dec. 7, 2017, which is incorporated herein by reference in its entirety.

BACKGROUND

Steer by wire (SBW) steering systems do not have a direct mechanical connection between the human driver and the steerable road wheels, rather input from the human driver is conveyed to the road wheels using one or more electrical signals that cause torque to be generated and applied at the road wheels. The driver interacts with a handwheel actuator (HWA), and the road wheels are steered by a road wheel actuator (RWA). These two systems are only linked electrically (by wires).

SUMMARY

Technical solutions are described herein for steer-by-wire (SBW) steering systems to detect a rack-limiting condition and generate responsive handwheel torque for a driver.

According to one or more embodiments, a steer-by-wire steering system detects a rack-limiting condition. The steer-by-wire steering system includes a processor that receives input signals comprising a handwheel velocity signal and a vehicle speed signal. The processor determines a simulated left end stop position of a rack based on the input signals, and a simulated right end stop position of a rack based on the input signals. The processor compares a rack position with the simulated left end stop position and the simulated right end stop position. The processor generates a feedback signal based on a determination that the rack position is not within a range bound by the left end stop position and the right end stop position.

According to one or more embodiments, a method to detect a rack-limiting condition includes receiving input signals comprising a handwheel velocity signal and a vehicle speed signal. The method further includes determining a simulated left end stop position of a rack based on the input signals. The method further includes determining a simulated right end stop position of a rack based on the input signals. The method further includes comparing a rack position with the simulated left end stop position and the simulated right end stop position. The method further includes generating a feedback signal based on a determination that the rack position is not within a range bound by the left end stop position and the right end stop position.

A computer program product comprising a computer readable storage device having stored therein one or more computer executable instructions, which when executed by a processor perform a method to detect a rack-limiting condition. The method includes receiving input signals comprising a handwheel velocity signal and a vehicle speed signal. The method further includes determining a simulated left end stop position of a rack based on the input signals. The method further includes determining a simulated right end stop position of a rack based on the input signals. The method further includes comparing a rack position with the simulated left end stop position and the simulated right end stop position. The method further includes generating a feedback signal based on a determination that the rack position is not within a range bound by the left end stop position and the right end stop position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Described herein are several embodiments of steering systems, such as steer-by-wire (SBW) steering systems, that provide curb-condition detection.

Figure 1:
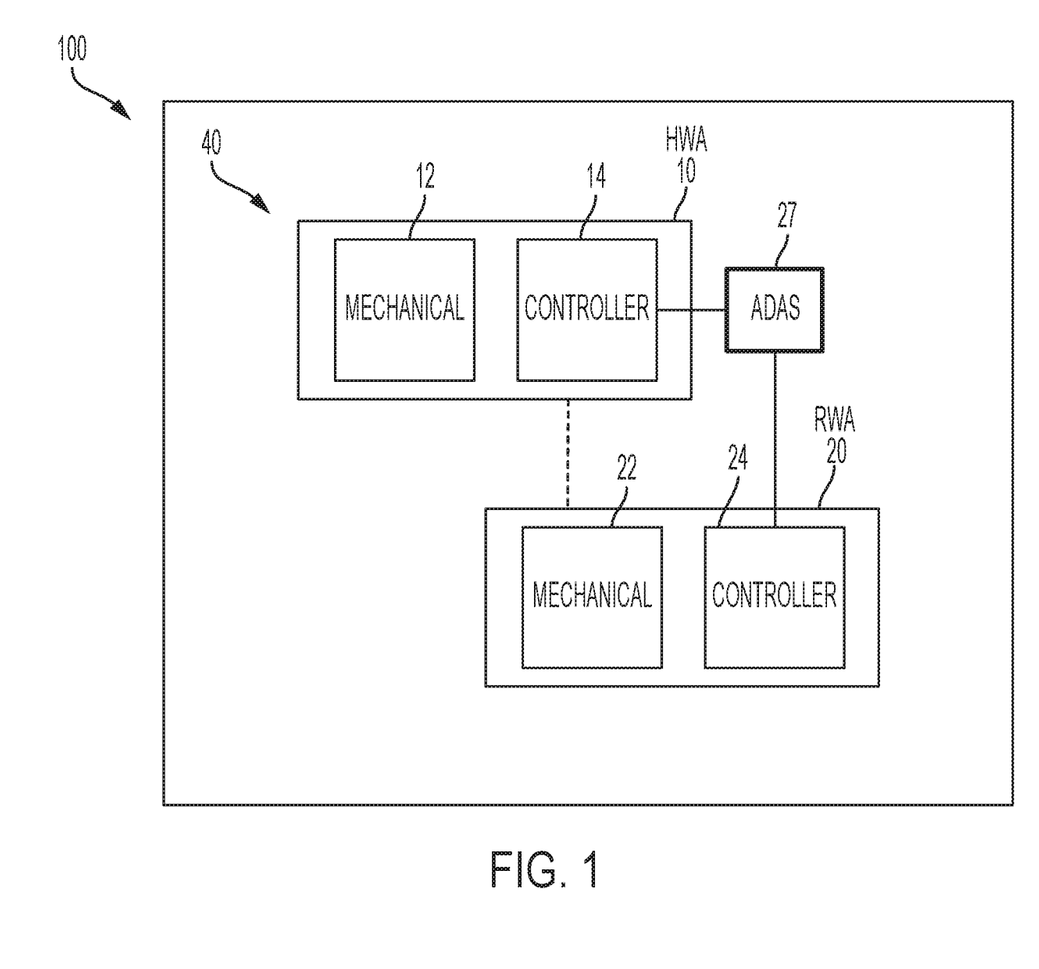
FIG. 1 illustrates a vehicle including a steering system, according to one or more embodiments.

Referring now to the Figures, where the invention will be described with reference to specific embodiments, without limiting same, a steer by wire steering (SBW) system 40 in a vehicle 100 is depicted in FIG. 1. It will be appreciated that the SBW system 40 shown and described can be used in an autonomous or semi-autonomous vehicle or in a more conventional vehicle. The SBW system 40 includes a handwheel actuator (HWA) 10 and a roadwheel actuator (RWA) 20.

The HWA 10 includes one or more mechanical components 12, such as a handwheel (steering wheel), a steering column, a motor/inverter attached to the steering column either through a gear mechanism or a direct drive system. The HWA 10 further includes a microcontroller 14 that controls the operation of the mechanical components 12. The microcontroller 14 receives and/or generates torque via the one or more mechanical components 12.

The RWA includes one or more mechanical components 22, such as a steering rack and/or pinion coupled to a motor/inverter through a ball-nut/ball-screw (gear) arrangement, and the rack is connected to the vehicle roadwheels/ tires through tie-rods. The RWA 20 includes a microcontroller 24 that controls the operation of the mechanical components 22. The microcontroller 24 receives and/or generates torque via the one or more mechanical components 22.

The microcontrollers 14 and 24 are coupled through electrical connections that allow signals to be transmitted/ received. As referred to herein, a controller can include a combination of the HWA controller 14 and the RWA controller 24, or any one of the specific microcontrollers.

In one or more examples, the controllers 14 and 24 of the SBW system 40 communicate with each other through CAN interface (or other similar digital communication protocols). Guidance of the vehicle 100 that is fitted with the SBW system 40 is performed by use of the steering gear, with an input shaft that is rotated by the RWA 20, such as a servo actuator. The RWA 20 receives an electronic communication signal of rotation of the steering wheel by the driver. A driver controls the steering wheel to directionally control the vehicle 100. The angle from HWA 10 is sent to the RWA 20 which performs position control to control rack travel to guide the roadwheel. However, due to the lack of mechanical connection between the steering wheel and the road wheels, the driver is not provided with a feel for the road without torque feedback (unlike the case in an EPS as described earlier).

In one or more examples, the HWA 10 that is coupled to the steering column and steering wheel simulates the driver's feel of the road. The HWA 10 may apply tactile feedback in the form of torque to the steering wheel. The HWA 10 receives a rack force signal from the RWA 20 to generate an appropriate torque feel for the driver. Alternatively, the handwheel angle and vehicle speed can also be used to generate desired torque feel to the driver.

It will be appreciated that the steer-by-wire steering system 40 that is shown and described can be used in an autonomous or semi-autonomous vehicle or in a more conventional vehicle. For example, the controllers 14 and 24 may also be associated with an autonomous or semi-autonomous vehicle utilizing an advanced driver assistance system ("ADAS") 27. The ADAS system 27 may utilize a navigation system that enables the vehicle 100 and its passengers to drive portal-to-portal without ever having the operator steer the vehicle 100. When the ADAS system 27 is activated, the steering wheel 12 is not required for control of the vehicle 100, and therefore, rotation of the steering wheel 12 is not required during the autonomous driving mode. In one or more examples that include the ADAS system 27, in a non-active mode of the ADAS system 27, the actuators 10 and 20 receive an electronic communication signal of rotation of the steering wheel 12 by the driver/operator of the vehicle 100. The ADAS system 27 is activated when an autonomous vehicle driving condition is desired, thereby deactivating directional control of the road wheels by the steering wheel 12. The driver is able to switch between the autonomous vehicle driving condition and a non-autonomous vehicle driving condition.

Figure 2:
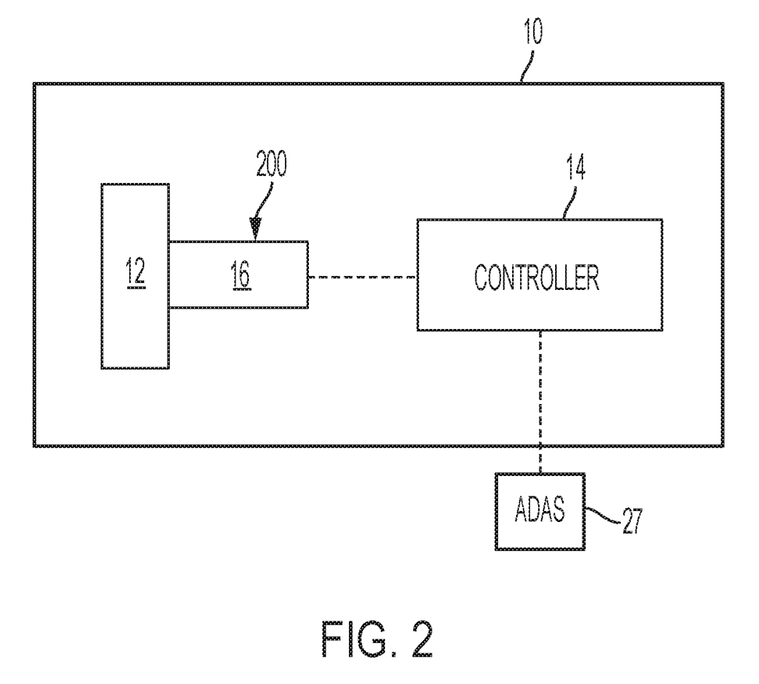
FIG. 2 depicts a block diagram of the HWA according to one or more embodiments.

FIG. 2 depicts a block diagram of the HWA according to one or more embodiments. The non-autonomous vehicle driving condition (non-active mode of ADAS system 27, if ADAS system 27 is included) includes a driver controlling the steering wheel 12 to directionally control the vehicle 100. As noted above, in a non-active mode of the ADAS system 27, the HWA 10 receives an electronic communication signal of rotation of the steering wheel 14 by the driver. However, due to the lack of mechanical connection between the steering wheel 12 and the road wheels, the driver is not provided with a feel for the road without torque feedback. In one or more examples, the HWA 10 includes a torque system 200 to simulate torque for the driver. The torque system 200 may include a servo actuator coupled to a steering column 16 and the steering wheel 12 to simulate the driver's feel of the road. The torque system 200 may apply tactile feedback in the form of torque to the steering wheel 12 and/or the steering column 16. It should be noted that in one or more examples, the torque feedback system 200 may provide the tactile feedback using any other components in lieu of another servo actuator coupled to the steering column 16 and steering wheel 12 to provide tactile feedback in the form of torque to the steering wheel 12 to simulate the driver's feel of the road.

Aspects of embodiments described herein may be performed by any suitable control system and/or processing device, such as the controllers 14 and 24. In one embodiment, the controllers 14 and 24 may be an electronic control unit (ECU). The vehicle 100 can include additional ECUs. The controllers 14 and 24 receive information from the other ECUs, such as a vehicle speed signal, one or more sensor information signals, and various other information electronic signals. As described earlier, there are multiple communication methods designed for inter-micro communication, such as the protocols SCI, CAN, and MLI, among others. Each protocol may satisfy a portion of the safety aspects of data handling, but does not inherently ensure that all safety aspects are covered.

When using SBW, the torque supplied by the HWA motor is controlled to a Reference Torque (Tref). This reference torque is then compared to the actual torque measured at the handwheel (Tbar torque). The error between these two generates error, and a control loop is used to manage the torque error. The control is sometimes referred to as closed-loop torque control.

A technical challenge exists when the vehicle 100 is in a condition where the rack 22 cannot physically move due to either its mechanical limits, or environmental restrictions (for example, in a ditch, a rut, at a curb, or the like) or system capacity restrictions (for example, rack motor can be in a degraded state where its output capacity is reduced). In such cases, the normal steering feel algorithms cannot detect these conditions, and as a result the HWA 10 cannot provide an adequate amount of torque (typically large amount of torque and beyond a torque sensor sensing range) to represent, to the driver, the limited situation the rack is in. However, it is critical to inform the driver of these conditions so that the driver can take appropriate action. It is also very important to provide adequate torque feedback to prevent the driver from moving the handwheel 12 in a direction that the rack 22 cannot follow. The latter can cause the handwheel 12 and roadwheel (or rack 22) to be out of synchronization which can create other problems. Accordingly a comprehensive function is needed to allow the detection of all situations where rack motion is restricted and provide appropriate feedback to the driver under those circumstances. The technical solution described herein address such technical challenges.

Figure 3:
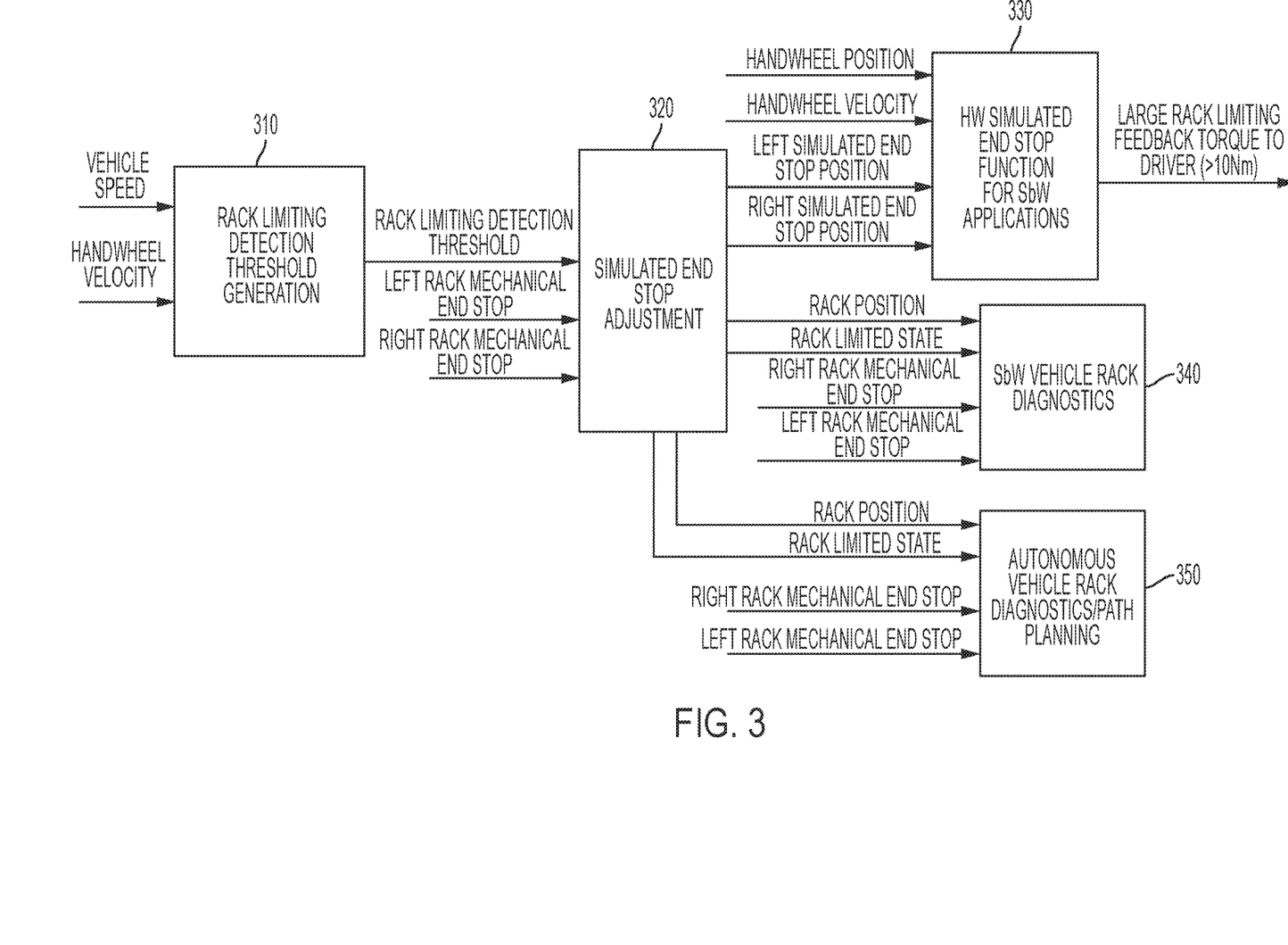
FIG. 3 depicts a block diagram of rack limiting detection and feedback according to one or more embodiments.

FIG. 3 depicts a block diagram of rack limiting detection and feedback according to one or more embodiments. The detection and feedback are depicted using five function blocks: rack limiting detection threshold generation 310, simulated end stop adjustment 320, handwheel simulated end stop function 330, SBW vehicle rack diagnostics 340, and autonomous vehicle rack diagnostics/path planning 350. It should be noted that the depicted blocks are exemplary and that in other examples, the detection and feedback can be represented using different blocks and/or additional and fewer blocks.

The SBW vehicle rack diagnostics 340 is responsible for dynamically determining a fault condition with the rack (or other components) of the SBW system 40. For example, if the one or more components of the SBW system 40 are not operating within predetermined thresholds/ranges that are associated with the respective components, the SBW vehicle rack diagnostics 340 raises an error flag that can cause the SBW system 40 to notify the driver and/or prevent any further operation of the SBW system 40. In one or more examples, if the vehicle 100 is equipped with an ADAS 27, the error flag can cause the ADAS 27 to maneuver the vehicle 100 to a safe stop, to a service station, or perform any other maneuver.

In a similar manner, the autonomous vehicle rack diagnostics/path planning 350 is responsible for dynamically determining a fault condition with the rack (or other components) of the vehicle 100. For example, if the one or more components of the vehicle 100 are not operating within predetermined thresholds/ranges that are associated with the respective components, the autonomous vehicle rack diagnostics/path planning 350 raises an error flag that can cause the vehicle 100 to notify the driver and/or prevent any further operation of the vehicle 100. In one or more examples, the error flag can cause the ADAS 27 to maneuver the vehicle 100 to a safe stop, to a service station, or perform any other maneuver.

Figure 4:
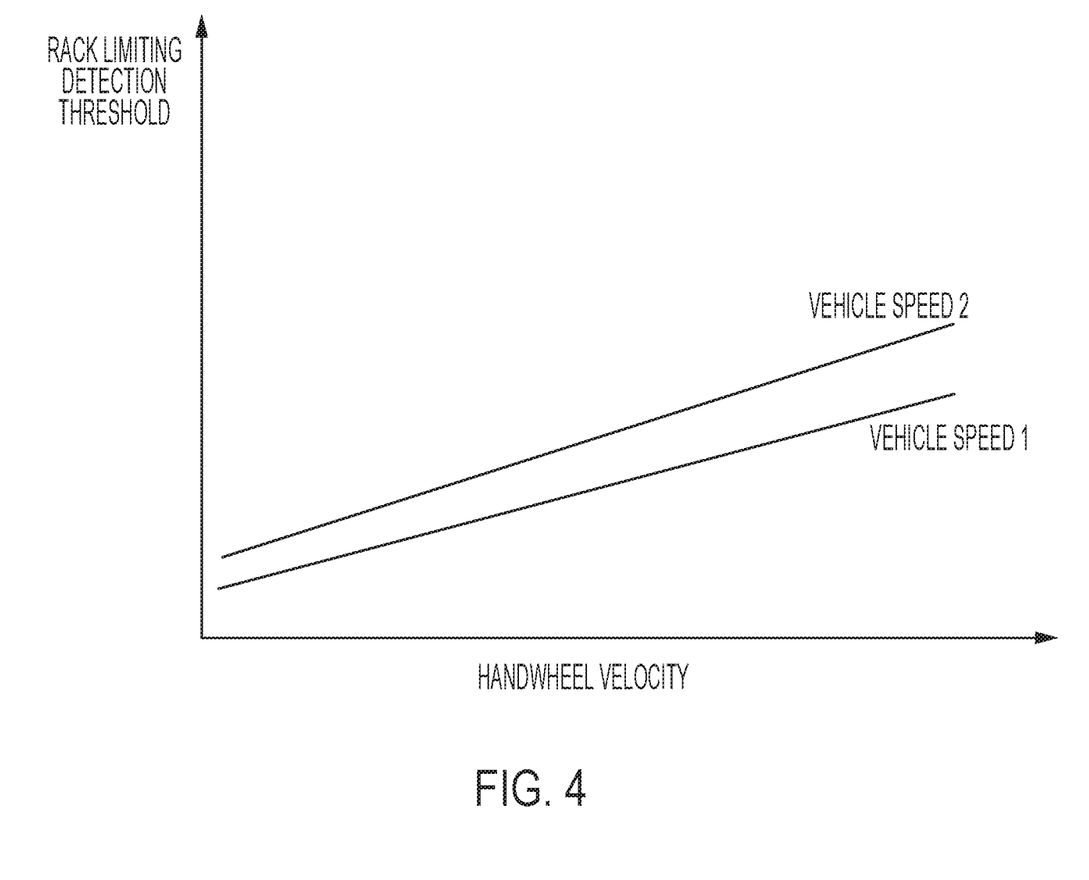
FIG. 4 depicts an example of how rack limiting detection threshold can be calculated based on handwheel velocity and vehicle speed.

The rack limiting detection threshold generation 310, takes vehicle speed and handwheel velocity as input and calculates a rack limiting detection threshold. FIG. 4 depicts an example of how the rack limiting detection threshold can be calculated based on the two inputs according to one or more embodiments. As can be seen the rack limiting detection threshold varies dynamically as the vehicle speed changes.

Referring to FIG. 3, the second block, simulated end stop adjustment 320, takes the calculated rack limiting detection threshold as well as a left rack mechanical end stop and a right rack mechanical end stop and calculates left and right simulated end stop positions. In one or more examples, the calculation is performed using following expressions. However, in other examples, the calculation can vary without deviating from the innovative concepts of the technical solutions described herein.

Simulated left end stop position=max(rack position−rack limiting detection threshold, left mechanical rack limit); and Simulated right end stop position=min(rack position+rack limiting detection threshold, right mechanical rack limit).

The output of the simulated end stop adjustment 320 determines the state of the rack movement and relays this to the SBW vehicle rack diagnostics 340 if the vehicle 100 is a SBW-equipped vehicle. Alternatively, or in addition, the simulated end stop adjustment 320 conveys the output to the autonomous vehicle rack diagnostics/path planning 350 if the vehicle 100 is an autonomous vehicle. In the case that the vehicle 100 is a SBW equipped autonomous vehicle, both blocks 340 and 350 can receive the output from the simulated end stop adjustment 320. The left rack mechanical end stop and the right rack mechanical end stop are predetermined values representing a physical limit of the movement of the rack.

Finally, the HW simulated end stop function 330 takes handwheel position, handwheel velocity, the left and right simulated end stop positions and computes an appropriate amount of notification torque (typically >10 Nm) to alert the driver of the circumstances and prevent the driver from creating out of synchronization condition between the handwheel 12 and the roadwheel. This function is performed in a SBW-equipped vehicle. This function is implemented by a position control algorithm as follows: if handwheel position is greater than (to the right of) right simulated end stop positions, activate position control algorithm to return handwheel 12 to the right simulated end stop position. Similarly, if handwheel position is less than (to the left of) left simulated end stop positions, also activate the position control algorithm to return the handwheel 12 to the left simulated end stop position. If the handwheel 12 is between left and right simulated end stop positions, then the handwheel simulated end stop function 330 is deactivated and normal steering feel function takes over to facilitate the torque system 200 to provide the driver normal steering feel.

The use of a position control algorithm rather than using the torque system 200 in handwheel simulated end stop function 330 allows the typical torque sensing limit of 10 Nm to be exceeded. Accordingly, an adequate amount of torque feedback can be provided to the driver for rack limiting feedback, where the adequate amount of torque is not limited by the torque sensing limit, rather by a torque generation limit of the HWA 10. Typically, the torque generation limit of the HWA 10 (e.g. 65 Nm) is larger than the torque sensing limit (10 Nm). Accordingly, the technical solutions described herein facilitate the SBW 40 to provide a larger torque than before, where the larger torque can be noticed by the driver, and accordingly, causing a notification to the driver.

Figure 5:
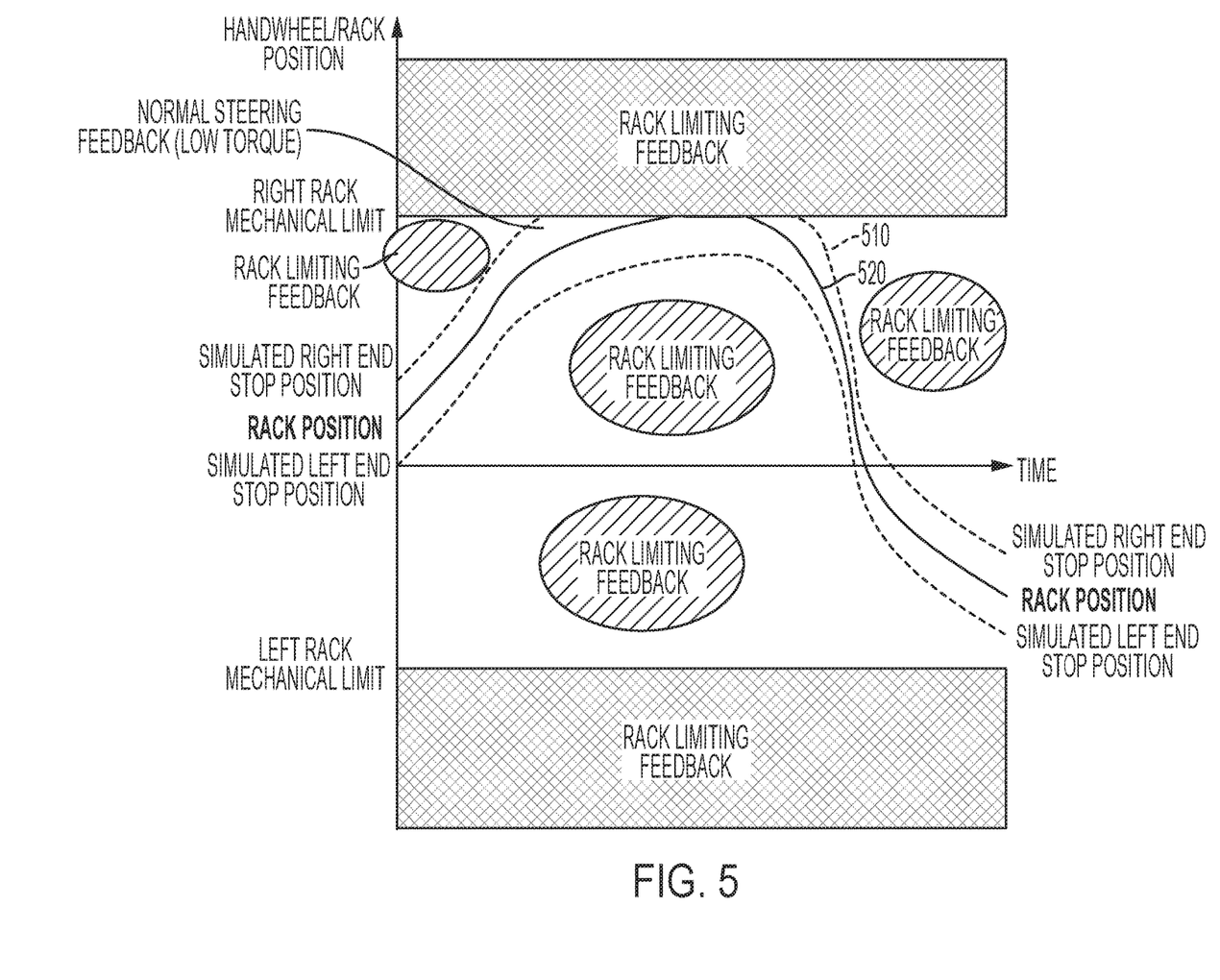
FIG. 5 shows an example operation of the rack limiting condition detection and feedback according to an example scenario.

FIG. 5 shows an example operation of the rack limiting condition detection and feedback according to an example scenario. In FIG. 5, "normal" steering feedback is provided to the driver when handwheel position is within the dashed lines, and otherwise the notification torque according to the rack limiting detection and feedback described herein is provided. Here, "normal" steering feedback is the simulated torque feedback according to road surface when the road wheel is not stuck or prevented from movements.

It can be seen from FIG. 5 that simulated end stop positions form a narrow band 510 around the actual rack position with the width of the band 510 being the detection threshold that was computed. When the band 510 meets the rack mechanical limit, the band 510 is then limited by the mechanical limit values (520). When rack is limited, rack cannot follow the handwheel 12 position, causing the handwheel position to go beyond the band 510. When this happens, rack limiting is detected, and corresponding amount of feedback is provided by generating the notification torque to be provided at the handwheel 12 by using the simulated end stop 330 function described above.

Figure 6:
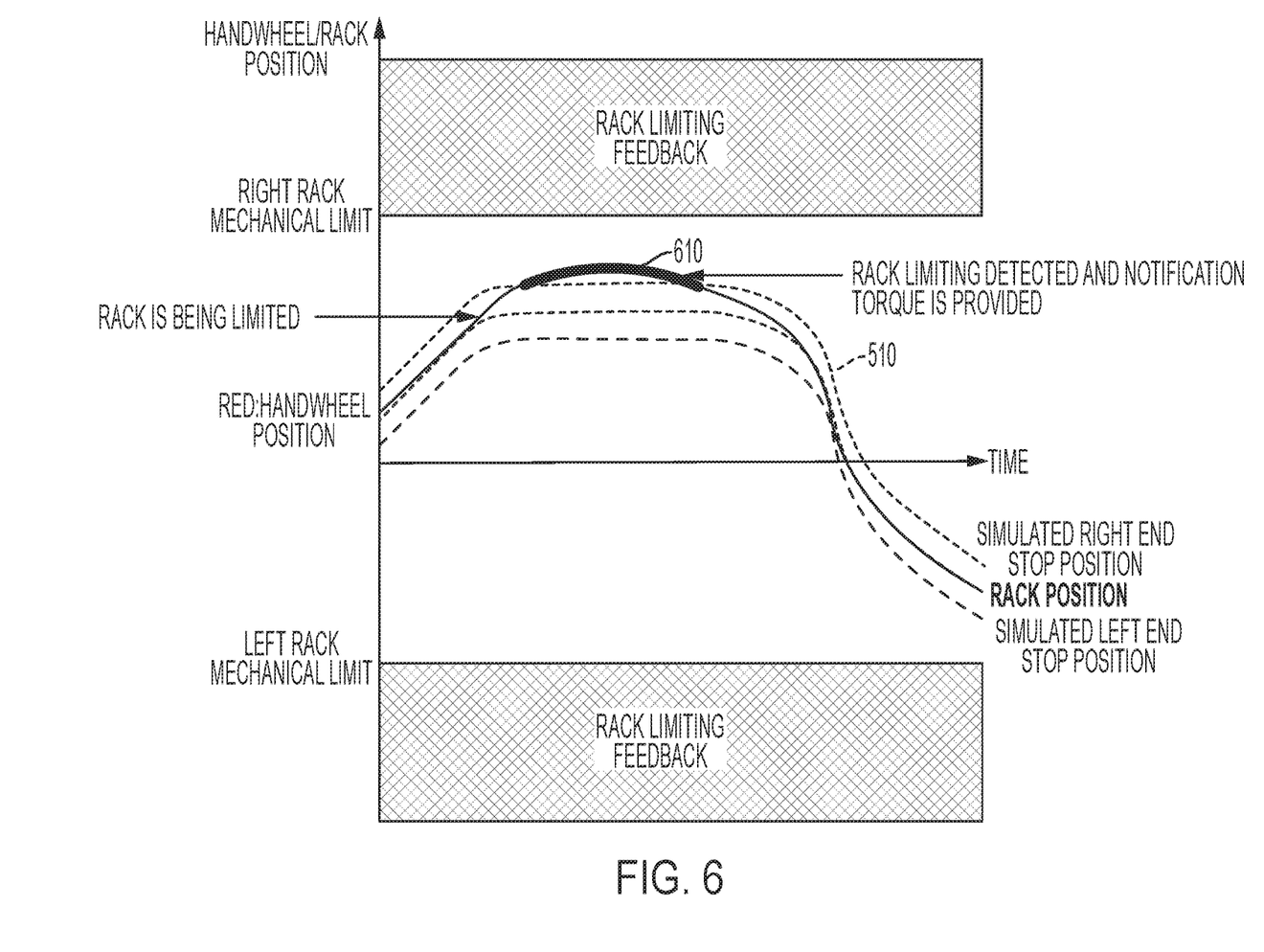
FIG. 6 shows another example operation of the rack limiting condition detection and feedback according to an example scenario.

FIG. 6 shows another an example operation of the rack limiting condition detection and feedback according to an example scenario. In this example scenario, the rack is limited before the mechanical limit is reached. As can be seen, where rack is not limited, the rack position follows handwheel position based on the closed loop rack position tracking. In this case, handwheel position is always located between the simulated left and right end stop positions where the normal steering feel is provided using the torque system 200. Where the rack is limited, i.e. the rack cannot follow the handwheel position, it causes the handwheel position to go beyond the simulated right end stop position. The segment of handwheel position curve 610 in FIG. 6 represents the detection of rack limiting condition in which the corresponding amount of notification torque is provided to the driver as feedback.

Figure 7:
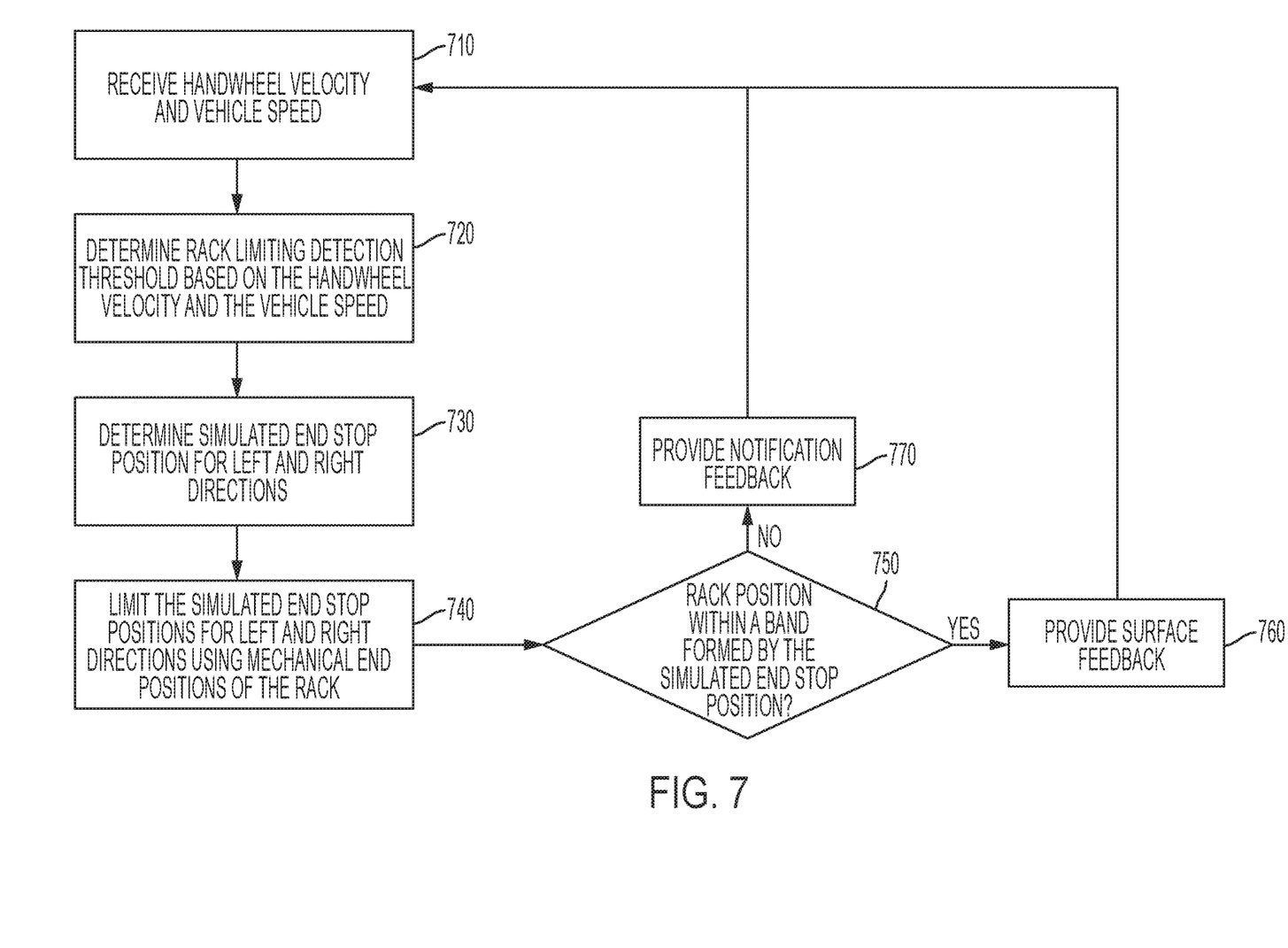
FIG. 7 depicts a flowchart for rack-limiting condition detection and the corresponding steering wheel torque feedback for SBW systems according to one or more embodiments.

FIG. 7 depicts a flowchart for rack-limiting condition detection and the corresponding steering wheel torque feedback for SBW systems according to one or more embodiments. The depicted method 700 includes receiving, by a controller of the SBW system 40, a handwheel velocity and a vehicle speed signal (710). The method 700 further includes determining, using the input values, a rack limiting detection threshold (720). The rack limiting detection threshold is further used for computing, at runtime, simulated end stop positions for the rack (730). The simulated end stop positions are computed for a left and a right movement of the rack. In one or more examples, additional simulated end stop positions can also be computed. The simulated end stop positions are further limited using predetermined mechanical stop positions of the rack (740).

The method further includes comparing the rack position with the simulated end stop positions that are computed (750). If the rack position is within a band formed by the simulated end stop positions, the RWA 20 provides "normal" feedback according to road surface, such as based on a coefficient of friction of the road surface (760). Such feedback is limited by the torque sensing capabilities, such as within 10 Nm (first predetermined limit).

Alternatively, if the rack position exceeds the band formed by the simulated end stop positions, the RWA 20 generates and provides a feedback signal (770). The feedback signal can include a torque command for the HWA 10 to generate at the handwheel 12. For example, the torque command can be larger torque (compared to the normal feedback). The torque command is not limited by the torque sensing capabilities, rather by the torque generation limit of the HWA 10, such as 65 Nm (second predetermined limit). The torque command can inhibit movement of the handwheel 12 by the driver, accordingly, preventing the handwheel 12 to be at a position that is unsynchronized with the road wheels that are stuck.

In one or more examples, the feedback signal can include a notification to the ADAS 27 to adjust a maneuver of the vehicle 100. For example, the ADAS 27 can stop the vehicle 100 and/or stop requesting the vehicle 100 to turn in the direction in which the curb/rut is detected. The ADAS 27 can further update a path planned for the vehicle 100 based on the feedback. It will be appreciated that, as used and defined herein, the term "curb" may refer to any type of environmental obstruction encountered by one or more roadwheels that would cause a limit of rack travel and is not to be interpreted as only a physical road curb. In non-limited examples, the term "curb" as used herein may refer to any environmental obstruction such as a physical curb, a rut, a ramp, a raised or depressed sewer grate, a small ditch or hump, etc.

The technical solutions described herein accordingly facilitate an SBW to detect the rack-limiting conditions. Further, the technical solutions described herein ensure to not falsely set diagnostics related to tracking errors between the HWA and the RWA. If the rack-limiting condition is not properly detected, the driver may continue turning the wheel (when limited to a predetermined value) and the position tracking error may increase and potentially falsely trigger an error when it is not a system failure, rather an environmental condition limiting the SBW system from performing as expected. Providing the additional HWA torque (up to a predetermined maximum HWA maximum value) reduces the chances of such false tracking errors in the rack-limiting conditions, and additionally provide a more robust input to diagnostics within the SBW system.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A steer-by-wire steering system configured to detect a rack/roadwheel-limiting condition or a vehicle limiting condition, the steer-by-wire steering system comprising:
a processor configured to:
receive input signals comprising a handwheel velocity signal and a vehicle speed signal;
determine a simulated left end stop position of a rack based on the input signals;
determine a simulated right end stop position of a rack based on the input signals;
compare a rack position with the simulated left end stop position and the simulated right end stop position; and
generate a feedback signal based on a determination that the rack position is not within a range that is bound by the simulated left end stop position and the simulated right end stop position.

2. The steer-by-wire steering system of claim 1, wherein determining the simulated left end stop position and the simulated right end stop position comprises:
determining a rack limiting threshold based on the handwheel velocity signal and the rack velocity signal.

3. The steer-by-wire steering system of claim 2, wherein determining the simulated left end stop position comprises: simulated left end stop position=max (rack position−rack limiting threshold, left mechanical rack limit), where the left mechanical rack limit is a predetermined value.

4. The steer-by-wire steering system of claim 2, wherein determining the simulated right end stop position comprises: simulated right end stop position=min (rack position+rack limiting detection threshold, right mechanical rack limit), where the right mechanical rack limit is a predetermined value.

5. The steer-by-wire steering system of claim 1, wherein the processor is further configured to adjust a commanded rack position based on the feedback signal.

6. The steer-by-wire steering system of claim 1, wherein the processor is further configured to generate a handwheel torque based on the feedback signal.

7. The steer-by-wire steering system of claim 1, wherein the processor is further configured to perform a vehicle maneuver based on the feedback signal.

8. A method to detect a rack/roadwheel-limiting condition or a vehicle limiting condition, the method comprising:
receiving input signals comprising a handwheel velocity signal and a vehicle speed signal;
determining a simulated left end stop position of a rack based on the input signals;
determining a simulated right end stop position of a rack based on the input signals;
comparing a rack position with the simulated left end stop position and the simulated right end stop position; and
generating a feedback signal based on a determination that the rack position is not within a range bound by the simulated left end stop position and the simulated right end stop position.

9. The method of claim 8, wherein determining the simulated left end stop position and the simulated right end stop position comprises:
determining a rack limiting threshold based on the handwheel velocity signal and the vehicle speed signal.

10. The method of claim 9, wherein determining the simulated left end stop position comprises: simulated left end stop position=max (rack position−rack limiting threshold, left mechanical rack limit), where the left mechanical rack limit is a predetermined value.

11. The method of claim 9, wherein determining the simulated right end stop position comprises: simulated right end stop position=min (rack position+rack limiting detection threshold, right mechanical rack limit), where the right mechanical rack limit is a predetermined value.

12. The method of claim 8, further comprising adjusting a commanded rack position based on the feedback signal.

13. The method of claim 8, further comprising generating a handwheel torque based on the feedback signal.

14. The method of claim 8, further comprising performing a vehicle maneuver based on the feedback signal.

15. A computer program product comprising a computer readable storage device having stored therein one or more computer executable instructions, which when executed by a processor perform a method to detect a rack/roadwheel-limiting condition or a vehicle limiting condition, the method comprising:
receiving input signals comprising a handwheel velocity signal and a vehicle speed signal;
determining a simulated left end stop position of a rack based on the input signals;
determining a simulated right end stop position of a rack based on the input signals;
comparing a rack position with the simulated left end stop position and the simulated right end stop position; and
generating a feedback signal based on a determination that the rack position is not within a range bound by the simulated left end stop position and the simulated right end stop position.

16. The computer program product of claim 15, wherein determining the simulated left end stop position and the simulated right end stop position comprises:
determining a rack limiting threshold based on the handwheel velocity signal and the vehicle speed signal.

17. The computer program product of claim 16, wherein determining the simulated left end stop position comprises: simulated left end stop position=max (rack position−rack limiting threshold, left mechanical rack limit), where the left mechanical rack limit is a predetermined value.

18. The computer program product of claim 16, wherein determining the simulated right end stop position comprises: simulated right end stop position=min (rack position+rack limiting detection threshold, right mechanical rack limit), where the right mechanical rack limit is a predetermined value.

19. The computer program product of claim 15, wherein the method further comprises generating a handwheel torque based on the feedback signal.

20. The computer program product of claim 15, wherein the method further comprises performing a vehicle maneuver based on the feedback signal.

* * * * *